UNITED STATES PATENT OFFICE.

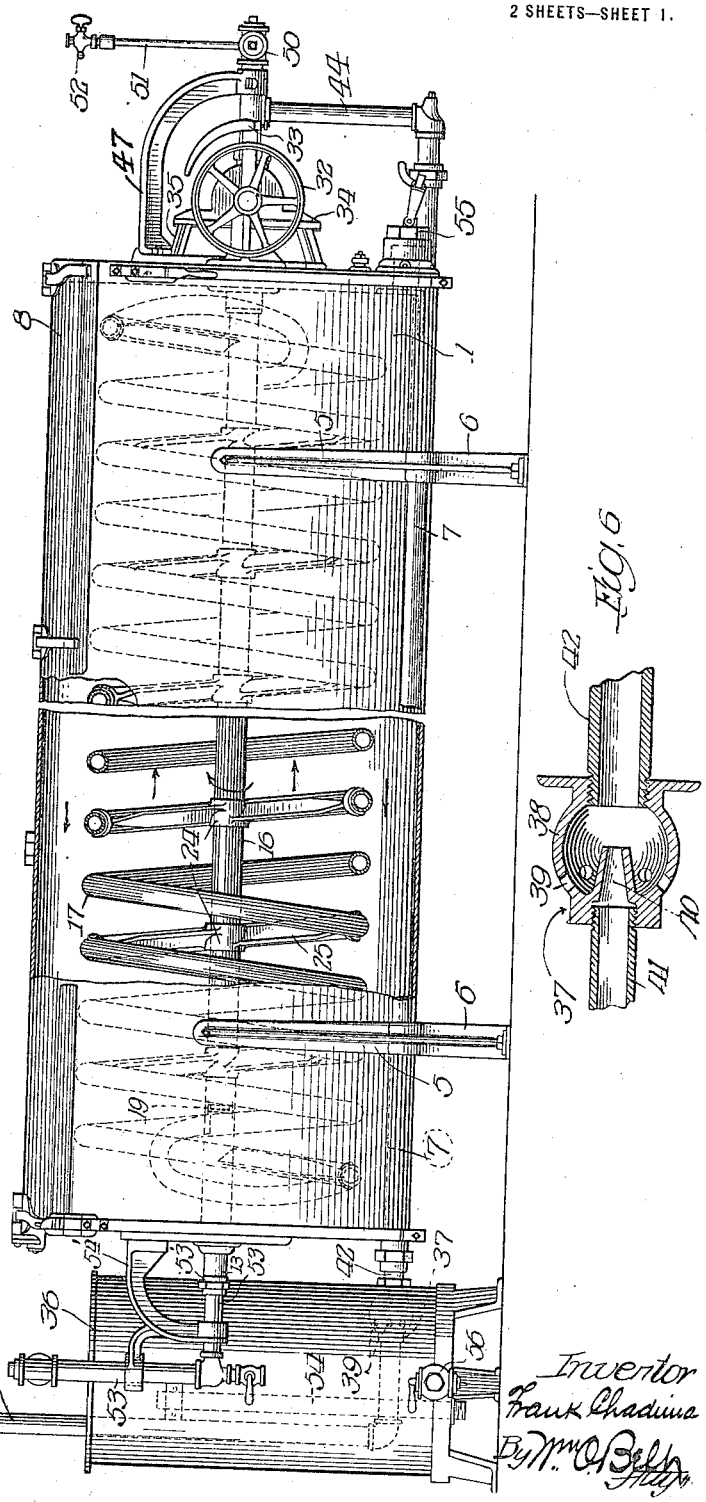

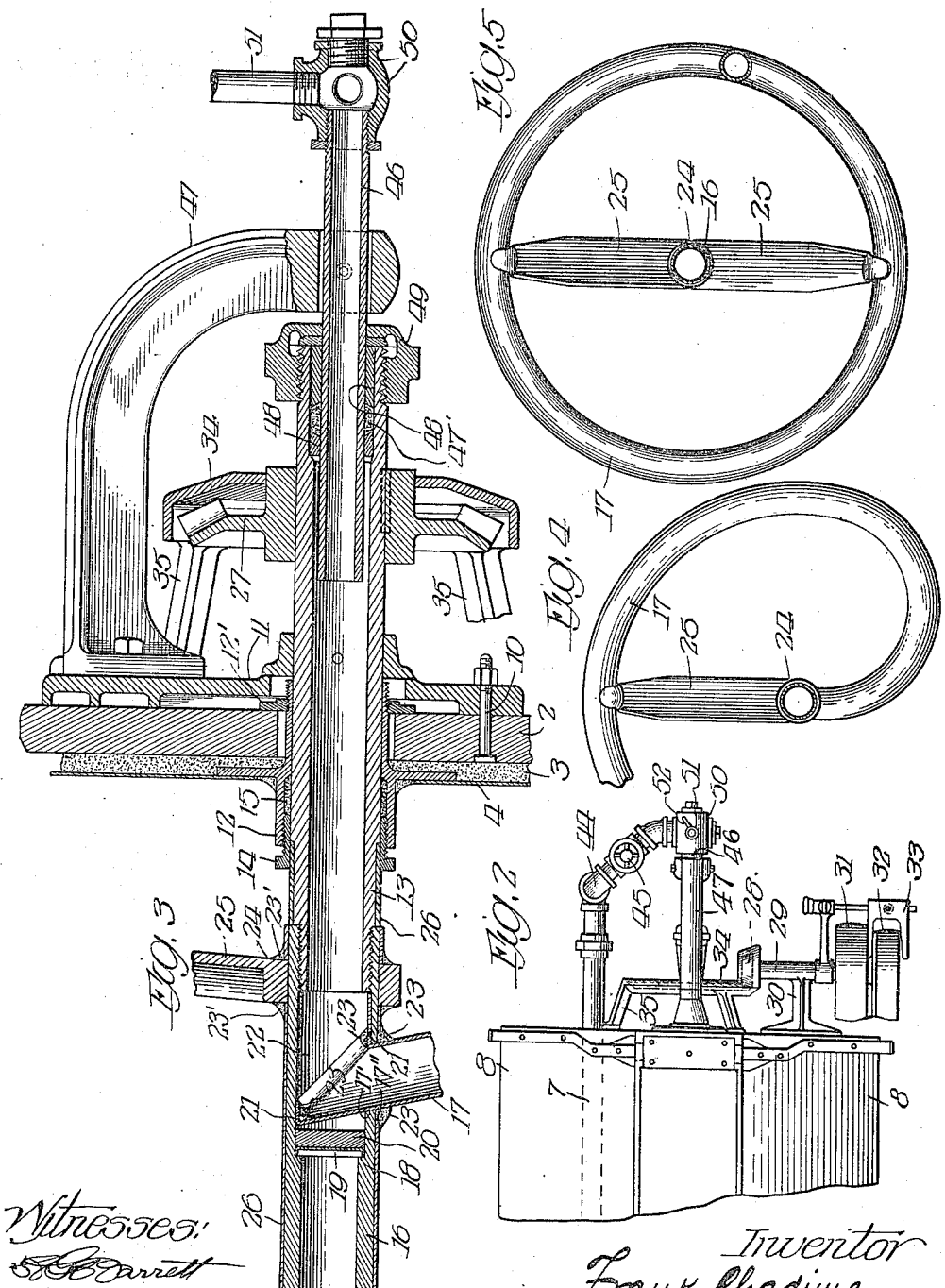

FRANK CHADIMA, OF CEDAR RAPIDS, IOWA, ASSIGNOR TO J. G. CHERRY COMPANY, OF CEDAR RAPIDS, IOWA, A CORPORATION OF IOWA.

APPARATUS FOR PASTEURIZING, COOLING, AND RIPENING MILK, CREAM, AND OTHER LIQUIDS.

1,224,901.     Specification of Letters Patent.     Patented May 8, 1917.

Application filed April 21, 1915. Serial No. 22,780.

*To all whom it may concern:*

Be it known that I, FRANK CHADIMA, a citizen of the United States, residing at Cedar Rapids, in the county of Linn and State of Iowa, have invented certain new and useful Improvements in Apparatus for Pasteurizing, Cooling, and Ripening Milk, Cream, and other Liquids, of which the following is a specification.

This invention relates to apparatus for pasteurizing, cooling and ripening liquids.

The object of the invention is to provide an apparatus in which the operations of pasteurizing, cooling and ripening may be successively carried out without removing the liquid from the receptacle and without the necessity of exposing it to the atmosphere.

A further object of my invention is to provide an apparatus of the character described in which the metal parts are fully protected from corrosion, which may be easily assembled and which, when assembled, provides a strong and durable structure, the life of which may be indefinitely prolonged under reasonable conditions of use.

Other objects and advantages of my invention will be apparent as it is better understood by reference to the following specification, when read in connection with the accompanying drawings in which—

Figure 1 is a side elevation partially in section of the apparatus;

Fig. 2 is a plan view of one end of the apparatus showing the means for driving the rotatable coil;

Fig. 3 is a detail in section of a portion of one end of the apparatus, showing the means for connecting the ends of the coil to the shaft;

Figs. 4 and 5 are details in section showing the coil-supporting members, and

Fig. 6 is a detail in section of the injector in the circulation tank.

Referring to the drawings, 1 indicates a receptacle consisting of a wood or metal casing 2 (Fig. 3), having a lining 3 of corkboard or other suitable insulation and a metal lining 4. The receptacle 1 is mounted in any suitable number of supporting members 5, provided with legs 6, the supporting members being secured together and braced by the pipes 7. Covers 8, hinged in a suitable manner, give access to the interior of the receptacle 1.

Secured by the bolts 10 to either end of the receptacle are the end plates 11. Bearing members 12, made fast to the lining, are disposed through openings in the ends of the receptacles 1 and provide bearings for the shaft nipples 13. Lock nuts 12' hold the bearings 12 in proper relation with the ends of the receptacle and prevent the possible entrance of liquid between the casing 2 and the linings 3 and 4. Packing nuts 14 and packing 15 provide glands to prevent leakage of the liquids contained in the receptacle 1 through the bearings.

A hollow shaft 16 is threadedly mounted on the oppositely disposed nipples 13 and supports the spiral coil 17, the coil 17 being connected at either end to the shaft 16. In order to prevent the possibility of fluids entering the hollow shaft 16 beyond the ends of the coil 17 the ends of the shaft are bored out slightly to form shoulders 18. Disks 19 of copper are disposed in the shaft abutting the shoulders 18 and plugs 20 are provided at either end of the shaft by pouring molten lead upon the disks 19, thus effectively sealing the shaft intermediate its ends.

The ends of the coil 17 are operatively connected to the shaft 16 by inserting the ends of the coil through openings 17' in the shaft 16 adjacent its ends and flanging the tubing of the coil, as indicated at 21, to engage the inner periphery of the shaft. Members 22 are inserted in the ends of the shaft with one edge abutting the flanged ends 21 of the coil 17. The other edges of the members 22 are disposed in planes normal to the axis of the shaft 16 and adapted to abut the ends of the nipples 13, which threadedly engage the ends of the shaft 16. A tight connection is provided between the ends of the coil 17 and the shaft 16 by solder 23. The tubing of the coil 17 and the members 22 are preferably composed of copper and it will be readily seen that by the structure described the steel shaft 16 is protected from corrosion by the fluids which are circulated through the shaft and coil during the operation of the machine. The nipples 13 are readily removable for repair or replacement and it is accordingly unnecessary to protect the interior of the nipples.

The coil 17 is supported intermediate its ends by members 24, mounted at intervals on the shaft 16 and each having oppositely disposed arms 25, except the members 24 adjacent the ends of the coil which are provided with single arms 25. The arms 25 engage the convolutions of the coil 17 and are secured thereto by solder or in any other suitable manner. The arms 25 may be set at an angle to a plane normal to the axis of the shaft 16 and operate, as the shaft is rotated, to assist in propelling the liquid in the receptacle 1 toward one of the ends of the receptacle, whence it will flow back exteriorly of the coil so that a constant circulation is maintained.

The shaft 16 is surrounded by a sleeve 26 of metal, which is mounted on the shaft in sections between the members 24. In building up the shaft and coil a section of the sleeve 26 is mounted on the nipple 13, as indicated in Fig. 3, with its end extending beneath the packing nut 14. A member 24, having a single arm 25, is mounted on the shaft 16 adjacent the nipple 13 and the end of the coil 17 is secured in the opening at the end of the shaft 16, as previously described. Another section of the sleeve 26 is then applied with one end abutting the member 24 and this section has an opening 17" which registers with the opening 17' in the shaft to receive the end of the coil 17. All joints are tightly closed by means of solder 23' and the building operation continues until all of the necessary elements have been mounted on the shaft 16 and the opposite end of the coil has been secured thereto and the rotatable member, including the shaft and coil is complete. The coil and the members 24 and 25 are composed of non-corrosive metal, which may be tinned, if desired, and it will be readily seen that a unitary rotatable element is provided, which when once constructed will last indefinitely and will not be subject to corrosion either exteriorly or interiorly by fluids which contact therewith during the operation of the apparatus.

The shaft 16 is driven by means of a bevel gear 27, splined to the nipple 13 at one end of the receptacle 1. A bevel pinion 28 is mounted in engagement with the bevel gear 27 on a stub shaft 29, carried by a bracket 30, secured to the end of the receptacle 1. The shaft 29 may be driven from any suitable source of power through the pulley 31, secured thereto, a loose pulley 32 and a belt shifter 33 being provided to permit control of the driving mechanism. A housing 34 surrounds the bevel gear and pinion, 27 and 28, being supported by the legs 35 upon the end of the receptacle 1.

At the end opposite to the driving end of the receptacle 1 a reservoir or circulation tank 36 is provided. Within the tank 36 and adapted to be constantly immersed in the liquid contained therein is an injector 37, comprising a casing 38, provided with openings 39, and an injector nozzle 40, formed integrally therewith and disposed within the sleeve 38 and projecting beyond the openings 39. A pipe 41 is connected to a source of steam under pressure and to the injector 37. A pipe 42, connected to the injector 37, passes through the wall of the tank 36 and is connected by a suitable means with one of the pipes 7 disposed through openings in legs 6 and extending longitudinally of the receptacle 1 to the driving end of the receptacle 1, whence it connects through the pipe 44, having a valve 45 disposed therein, with a nipple 46 supported by a bracket arm 47 from the end wall of the receptacle 1 and entering the nipple 13 through a gland comprising the packing 47' and the members 48 held in position by the packing nut 49. The pipe 44 and nipple 46 are connected by means of a cross, T or elbow 50 to which is attached pipe 51 through which, when fluid is being circulated through the coil 17, a quantity of air controlled by a pet-cock 52, disposed adjacent the upper end of pipe 51, is permitted to enter through the cross, T or elbow 50, nipple 46 and thence into coil 17, thereby providing an air chamber at the top of each coil and the impelling force which creates and maintains a continuous circulation of liquid through coil 17 while in rotation.

The opposite end of the shaft 16 is connected through the nipple 13 and a suitable gland 53' with an upwardly extending pipe 53, supported from the end of the receptacle on a bracket 54', and adapted to discharge fluid from the shaft into the upper end of the tank 36. An overflow pipe 54 is provided in the tank 36 and adapted to be connected at its lower end to a waste pipe. Drain outlets are provided at 55 and 56 for the receptacle and circulation tank, respectively.

The operation of my apparatus will, it is thought, be apparent without further description of the structure thereof. The apparatus is adapted to provide for circulation of fluid for either heating or cooling purposes through the coils without the use of auxiliary pumps. When the device is used as a cooling apparatus the circulation tank 36 is filled with cooling liquid, such as brine, which is maintained at the desired temperature in any suitable manner. The pet-cock 52 is opened and the driving mechanism operated to rotate the shaft 16, carrying with it the coil 17. As the coil rotates, the liquid in the tank 36 is drawn through the pipes 42, 7 and 44 and nipple 46, into the coil. Air is simultaneously drawn through the pet-cock 52 and pipe 51 into the nipple 46 and thence into the coil and rises in each coil to the highest possible position in each convolution of the coil forming a slug of air at the top of each convolution. The function of the slug of air is to provide space which, as the coil revolves, forms a partial vacuum at the top of each of the convolutions, whereby a strong suction is produced in the system and the fluid is rapidly drawn through the coils. Constant and rapid circulation is thus provided without the use of an auxiliary pump.

When it is desired to heat the material contained in the receptacle 1, steam is admitted to the pipe 41 which passing through the injector nozzle 40 in the injector 37 draws fluid from the tank 36 through the openings 39 and simultaneously heats it by condensation of the steam. When the apparatus is operated in this manner the petcock 52 is closed, it being undesirable to admit air to the coils during the heating operation. The shaft 16 is rotated as before and the fluid is circulated through the coil 17 by the combined action of the coil itself and the force of the steam applied through the injector 37.

By withdrawing the fluid from the lower portion of the tank 36 I provide a more even temperature in the system, inasmuch as the cooler water in the tank will settle to the bottom and will be heated by the steam to the desired temperature. If the fluid is withdrawn from the upper portion of the tank it is liable to become overheated, owing to the smaller volume of fluid in circulation. The circulation tank acts as a temperature equalizing device and prevents overheating.

By the provision of the arms 25, secured to the shaft 16 and set at an angle to a plane normal thereto, the coil is assisted in maintaining a circulation of the contents of the receptacle 1, as indicated by the arrows in Fig. 1, and hence the temperature of the mass will be uniform throughout.

It will be obvious that various changes may be made in the form, construction and arrangement of the parts without departing from the spirit and scope of the invention, or sacrificing any of its material advantages, the form hereinbefore described being merely a preferred embodiment thereof.

I claim:

1. In an apparatus of the character described, the combination of a receptacle, a shaft having hollow ends, hollow bearing nipples connected to said shaft and journaled in the ends of said receptacle, a hollow coil connected at each end to the interiors of the hollow ends of said shaft, a circulation tank, stationary means disposed within said tank adjacent the bottom thereof and adapted to be constantly immersed in the liquid contained therein to draw said liquid from the bottom only of said tank, a pipe connecting said means to one of said bearing nipples, a pipe connected to the other of said bearing nipples and arranged to deliver liquid to the upper portion of said tank, and means for rotating said shaft whereby liquid is caused to circulate constantly between said tank and coil.

2. In an apparatus of the character described, the combination of a receptacle, a shaft having hollow ends rotatably supported in said receptacle, a hollow coil connected at each end to the interiors of the hollow ends of said shaft, a circulation tank, an injector disposed within said tank adjacent the bottom thereof and adapted to be constantly immersed in the liquid contained therein, means for supplying steam to said injector whereby said liquid is withdrawn from the lower portion only of said tank and simultaneously heated, a pipe connecting said injector to one end of said shaft, a pipe connected to the opposite end of said shaft and arranged to deliver liquid to the upper portion of said tank, and means for rotating said shaft, whereby liquid is caused to circulate constantly between said tank and coil.

3. In an apparatus of the character described, the combination of a receptacle, a shaft having hollow ends rotatably supported in said receptacle, a hollow coil connected at each end with the interiors of the hollow ends of said shaft, a circulation tank supported in spaced relation to said receptacle, stationary means disposed within said tank adjacent the bottom thereof and adapted to be constantly immersed in the liquid contained therein to draw said liquid from the bottom only of said tank, a pipe connecting said means to one end of said shaft, a pipe connected to the opposite end of said shaft and arranged to deliver liquid to the upper portion of said tank, and means for rotating said shaft whereby liquid is caused to circulate constantly between said tank and coil.

4. In an apparatus of the character described, the combination of a hollow shaft, openings in said shaft adjacent the ends thereof, a hollow spiral coil having its ends disposed through said openings and flanged to engage the inner periphery of said shaft, a member disposed within said shaft at each end thereof with one edge abutting the flanged end of said coil, the opposite edge of said member being disposed in a plane normal to the axis of said shaft, and a bearing nipple secured to the end of said shaft with its edge abutting the edge of said member.

5. In an apparatus of the character described, the combination of a hollow shaft, a sleeve on said shaft, openings in said shaft and sleeve adjacent the ends thereof, a hollow spiral coil having its ends disposed through said openings and flanged to engage the inner periphery of said shaft, a member disposed within said shaft at each end thereof with one edge abutting the flanged end of said coil, the opposite edge of said member being disposed in a plane normal to the axis of said shaft, a bearing nipple secured to each end of said shaft with its edge abutting the edge of said member, and plugs in said shaft behind the flanged ends of said coil.

6. In an apparatus of the character described, the combination of a receptacle, a circulation tank, stationary means for withdrawing liquid from the lower portion only of said tank, a rotatable hollow shaft within said receptacle, plugs in said shaft spaced from the ends thereof, openings in the wall of said shaft adjacent both ends thereof, a hollow spiral coil having its ends disposed through said openings and flanged to engage the inner periphery of said shaft, members disposed within said shaft with one edge abutting the flanged ends of said coil, the opposite edges of said members being disposed in planes normal to the axis of said shaft, bearing nipples secured to the ends of said shaft and abutting the edges of said members, a pipe connecting said liquid withdrawing means to one of said nipples, and means for rotating said shaft.

FRANK CHADIMA.

Witnesses:
W. L. CHERRY,
H. H. CHERRY.

Copies of this patent may be obtained for five cents each, by addressing the "Commissioner of Patents, Washington, D. C."